US008874819B2

(12) United States Patent
Chen

(10) Patent No.: US 8,874,819 B2
(45) Date of Patent: Oct. 28, 2014

(54) USB CONNECTION CABLE

(75) Inventor: Wen-Pin Chen, Keelung (TW)

(73) Assignee: Action Star Enterprise Co., Ltd. (TW)

( * ) Notice: Subject to any disclaimer, the term of this patent is extended or adjusted under 35 U.S.C. 154(b) by 363 days.

(21) Appl. No.: 13/470,353

(22) Filed: May 13, 2012

(65) Prior Publication Data

US 2012/0295473 A1 Nov. 22, 2012

Related U.S. Application Data

(60) Provisional application No. 61/486,676, filed on May 16, 2011.

(51) Int. Cl.

*G06F 13/14* (2006.01)
*G06F 13/36* (2006.01)
*H01R 31/06* (2006.01)
*H01R 31/00* (2006.01)

(52) U.S. Cl.

CPC .............. *H01R 31/06* (2013.01); *H01R 31/005* (2013.01)
USPC ........................................... 710/305; 710/315

(58) Field of Classification Search

CPC .... H01R 31/06; H01R 31/005; G06F 13/385; G06F 13/4022; G06F 13/4027; G06F 13/4072; G06F 13/387; G06F 13/4059; G06F 3/0661
USPC .................................................. 710/305, 315
See application file for complete search history.

(56) References Cited

U.S. PATENT DOCUMENTS 6,746,273 B1 * 6/2004 Liu et al. ........................ 439/502
2002/0195993 A1 * 12/2002 Chiu ............................. 320/114

(Continued)

FOREIGN PATENT DOCUMENTS

CN 202487900 U * 10/2012 ........... H01R 13/648
CN 103164385 A * 6/2013 .............. G06F 15/76
EP 2360796 A1 * 8/2011 ............... H01R 9/03

OTHER PUBLICATIONS

Saade et al., "A system-level overview and comparison of three High-Speed Serial Links: USB 3.0, PCI Express 2.0 and LLI 1.0," Design and Diagnostics of Electronic Circuits & Systems (DDECS), 2013 IEEE 16th International Symposium on , pp. 147-152, Apr. 8-10, 2013.*

(Continued)

*Primary Examiner* — Faisal M Zaman

(57) ABSTRACT

The present invention relates to an improved USB connection cable, comprising: a first electrical connector, a second electrical connector and a third electrical connector, wherein the first electrical connector is used for connecting to a host computer, the second electrical connector is adopted for connecting to a first electronic device, and the third electrical connector is adopted for connecting to a second electronic device; Moreover, by way of electrically connecting the internal pins of the first USB electrical connector to the internal pins of the second USB electrical connector and the third USB electrical connector, the first USB electrical connector is able to transmit data to the second USB electrical connector and the third USB electrical connector, respectively; such that the improved USB connection cable can not be a media for data transfer used between the electronic device having an USB 3.0 electrical connector and the host computer with an USB 3.0 electrical connector, but also be the media for data transfer used between the electronic device having an USB 2.0 electrical connector and the host computer with an USB 3.0 electrical connector.

4 Claims, 4 Drawing Sheets

(56) References Cited

U.S. PATENT DOCUMENTS

| | | | | |
|---|---|---|---|---|
| 2005/0009404 | A1* | 1/2005 | Lee | 439/638 |
| 2007/0054550 | A1* | 3/2007 | Cuthbert et al. | 439/607 |
| 2008/0078578 | A1* | 4/2008 | Wang et al. | 174/72 R |
| 2008/0155161 | A1* | 6/2008 | Broumand et al. | 710/313 |
| 2009/0187693 | A1* | 7/2009 | Morozumi | 710/313 |
| 2010/0174835 | A1* | 7/2010 | Chung | 710/15 |
| 2010/0223416 | A1* | 9/2010 | Ibarra et al. | 710/315 |
| 2010/0233908 | A1* | 9/2010 | Tseng | 439/620.21 |
| 2010/0281187 | A1* | 11/2010 | Kim et al. | 710/15 |
| 2011/0159732 | A1* | 6/2011 | Kondo et al. | 439/607.01 |
| 2011/0161530 | A1* | 6/2011 | Pietri et al. | 710/14 |
| 2011/0179201 | A1* | 7/2011 | Monks et al. | 710/60 |
| 2011/0191503 | A1* | 8/2011 | Kakish | 710/15 |
| 2011/0208980 | A1* | 8/2011 | Brooks et al. | 713/300 |
| 2012/0011286 | A1* | 1/2012 | Wong et al. | 710/14 |
| 2012/0072634 | A1* | 3/2012 | Mueller et al. | 710/305 |
| 2012/0290761 | A1* | 11/2012 | Chen et al. | 710/305 |

OTHER PUBLICATIONS

Sun et al., "A dual-band antenna for wireless USB dongle applications," Antenna Technology (iWAT), 2013 International Workshop on , pp. 307-310, Mar. 4-6, 2013.*

McCorquodale et al., "A Monolithic and Self-Referenced RF LC Clock Generator Compliant With USB 2.0," Solid-State Circuits, IEEE Journal of , vol. 42, No. 2, pp. 385-399, Feb. 2007.*

Wen-Shan Chen et al., "A USB Dongle Antenna for Multiband Applications," Computer, Consumer and Control (IS3C), 2014 International Symposium on , pp. 384-386, Jun. 10-12, 2014.*

* cited by examiner

USB CONNECTION CABLE

CROSS-REFERENCE TO RELATED APPLICATIONS

This application claims priority from a U.S. Provisional Patent Application Ser. No. 61/486,676 filed May 16, 2011, the entire contents of which are incorporated herein by reference.

BACKGROUND OF THE INVENTION

1. Technical Field

The present invention relates to an USB connection cable, and more particularly, to an improved USB connection cable which can not only be a media for data transfer used between an electronic device having at least one USB 3.0 electrical connector and a host computer with at least one USB 3.0 electrical connector, but also be the media for data transfer used between an electronic device having at least one USB 2.0 electrical connector and the host computer with the at least one USB 3.0 electrical connector.

2. Description of Related Art

Recently, personal electronic products and computer peripheral devices are continuously introduced new, for example, digital cameras, smart phones, multimedia players, card readers, scanners, printers, webcam, etc. Moreover, for making the personal electronic product or the computer peripheral device be connected to the computer and facilitating the user to deal with data between the personal electronic product and the computer or between the computer peripheral device and the computer, USB (Universal Serial Bus) electrical connector and a connection thereof become an important connecting device used for connecting the personal electronic product and the computer, or connecting the computer peripheral device and the computer.

Please refer to FIG. 1, which illustrates a schematic diagram of using a conventional USB connection cable. As shown in FIG. 1, generally, the conventional USB connection cable 1' includes: a first USB electrical connector 11', a cable 13' and a second USB electrical connector 12', wherein the first USB electrical connector 11' can be an USB 2.0 USB electrical connector plug or an USB 3.0 USB electrical connector plug used for connecting to a host computer 2'. Moreover, according to the electrical connector type of the first USB electrical connector 11', the second USB electrical connector 12' can be an USB 2.0 USB electrical connector receptacle or an USB 3.0 USB electrical connector receptacle coupled to the first USB electrical connector 11' via the cable 13', and is adopted for connecting to an external electronic device 3', such as mobile phone, external hard drive, USB hub, flash drive, etc.

For the conventional USB connection cable 1', if the first USB electrical connector 11' is an USB 2.0 electrical connector plug (an USB 3.0 electrical connector), the second electrical connector 12' must be an USB 2.0 electrical connector receptacle (an USB 3.0 electrical connector receptacle), so that the conventional USB connection cable 1' can be a media for data transfer used between the host computer 2' and the electronic device 3'. Thus, though above descriptions, it is able to understand that the conventional USB connection cable 1' has the shortcomings and drawbacks as follows:

1. The electrical connector type of the second electrical connectors 12' is decided according to the electrical connector type of the first electrical connectors 11'.
2. Inheriting to above point 1, thus, when the user wants to connect the electronic device having an USB 3.0 electrical connector to the host computer 2', it must uses the USB connection cable 1' with an USB 3.0 electrical connector plug (the first electrical connector 11') and an USB 3.0 electrical connector receptacle (the second electrical connector 12') be the media for data transfer; moreover, when the user wants to connect the electronic device having an USB 2.0 electrical connector to the host computer 2', it must uses the USB connection cable 1' with an USB 2.0 electrical connector plug (the first electrical connector 11') and an USB 2.0 electrical connector receptacle (the second electrical connector 12') be the media for data transfer.
3. Inheriting to above point 2, so that, it is able to know that the conventional USB connection cable can not be the media for data transfer used between the electronic device having the USB 2.0 electrical connector and the host computer 2' with the USB 3.0 electrical connector.

Accordingly, in view of the conventional USB connection cable still has shortcomings and drawbacks, the inventor of the present application has made great efforts to make inventive research thereon and eventually provided an improved USB connection cable.

BRIEF SUMMARY OF THE INVENTION

The first objective of the present invention is to provide an improved USB connection cable, in which the internal pins of a first USB electrical connector are connected to the internal pins of a second USB electrical connector and a third USB electrical connector, so as to make the first electrical connector capable of transmitting data to the second USB electrical connector and the third electrical connector.

The second objective of the present invention is to provide an improved USB connection cable able to not only be a media for data transfer used between an electronic device having at least one USB 3.0 electrical connector and a host computer with at least one USB 3.0 electrical connector, but also being the media for data transfer used between an electronic device having at least one USB 2.0 electrical connector and the host computer with the at least one USB 3.0 electrical connector.

Thus, in order to achieve the abovementioned first and second objectives, the inventor proposes an improved USB connection cable, comprising:

a first electrical connector, used for connecting a host computer and having a plurality of pins;

a second electrical connector, coupled to the first electrical connector through a main cable and having a plurality of pins, the second electrical connector is adopted for connecting a first electronic device; and a third electrical connector, coupled to the first electrical connector through a branch cable and having a plurality of pins, the third electrical connector is adopted for connecting a second electronic device;

wherein the plurality of pins of the first electrical connector comprises a first negative differential signal pin, a first positive differential signal pin, a first negative signal receiving pin, a first positive signal receiving pin, a first negative signal transmitting pin, a first positive signal transmitting pin;

wherein the plurality of pins of the second electrical connector comprises a second negative differential signal pin, a second positive differential signal pin, a second negative signal receiving pin, a second positive signal receiving pin, a second negative signal transmitting pin, a second positive signal transmitting pin, moreover, the second negative signal receiving pin is coupled to the first negative signal receiving pin, the second positive signal receiving pin is coupled to the first positive signal receiving pin, the second negative signal transmitting pin is coupled to the first negative signal transmitting pin, and the second positive signal transmitting pin is coupled to the first positive signal transmitting pin;

wherein the plurality of pins of the third electrical connector comprises a third negative differential signal pin and a third positive differential signal pin, moreover, the third negative differential signal pin is coupled to the first negative differential signal pin, and the third positive differential signal pin is coupled to the first positive differential signal pin;

wherein when the first electrical connector is connected to the host computer and the second electrical connector is connected to the first electronic device, the host computer can transmit data or a control signal to the first electronic device through the first negative signal transmitting pin and the first positive signal transmitting pin of the first electrical connector and the second negative signal transmitting pin and the second positive signal transmitting pin of the second electrical connector; moreover, the host computer is able to read and receive the data stored in the first electronic device by way of the first negative signal receiving pin and the first positive signal receiving pin of the first electrical connector and the second negative signal receiving pin and the second positive signal receiving pin of the second electrical connector;

wherein when the first electrical connector is connected to the host computer and the third electrical connector is connected to the second electronic device, the host computer can transmit the data or the control signal to the second electronic device via the first negative differential signal pin and the first positive differential signal pin of the first electrical connector and the second negative differential signal pin and the second positive differential signal pin of the second electrical connector.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe an improved USB connection cable according to the present invention, embodiments of the present invention will be described in detail with reference to the attached drawings hereinafter.

Figure 1:
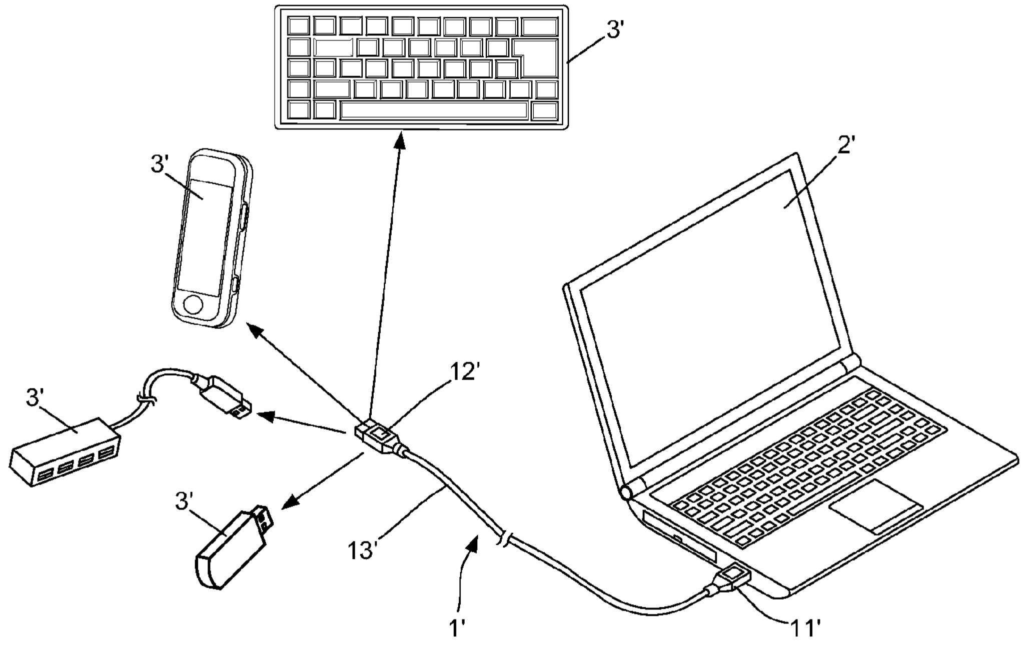
FIG. 1 (Prior Art)
FIG. 1 is a schematic diagram of using a conventional USB connection cable.
Figure 2:
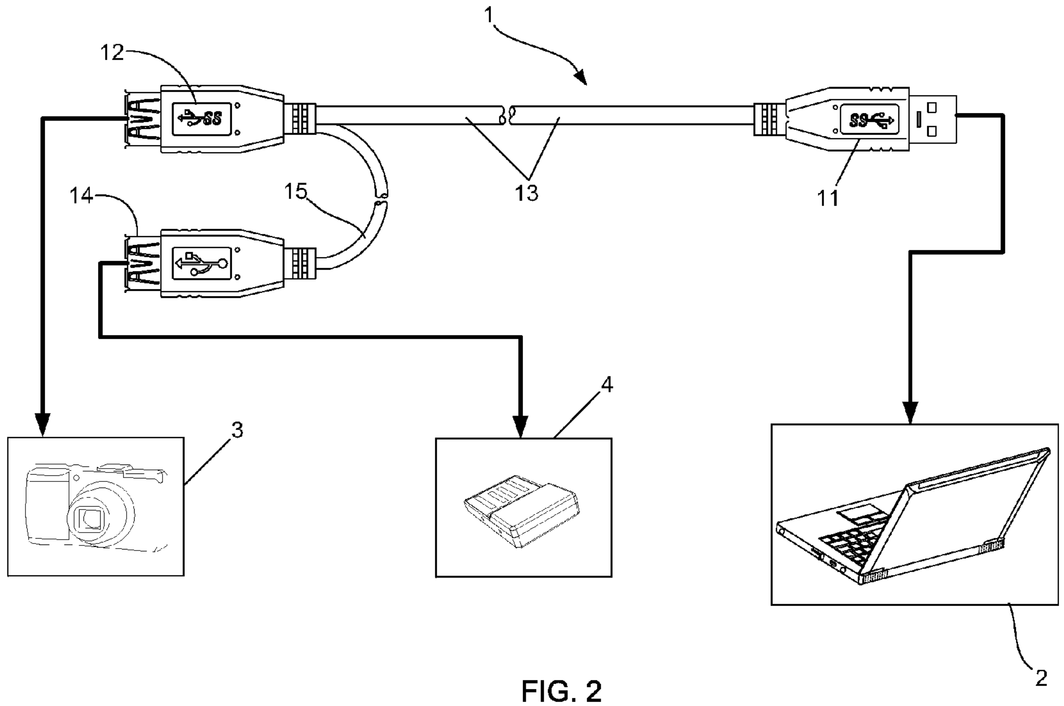
FIG. 2 is a framework diagram of an improved USB connection cable according to the present invention.

Please refer to FIG. 2, which illustrates a framework diagram of an improved USB connection cable according to the present invention. As shown in FIG. 2, the improved USB connection cable 1 includes: a first electrical connector 11, a second electrical connector 12 and a third electrical connector 14, wherein the first electrical connector 11 can be an USB 3.0 electrical connector plug or an USB 3.0 electrical connector receptacle, which is used for connecting to a host computer 2, moreover, in the embodiment of the improved USB connection cable 1, it is used the USB 3.0 electrical connector plug as the first electrical connector 11, and the USB 3.0 electrical connector plug (the first electrical connector 11) has a plurality of pins.

Continuously referring to FIG. 2, according to the electrical connector type of the first electrical connector 11, the second electrical connector 12 can be an USB 3.0 electrical connector receptacle or an USB 3.0 electrical connector plug, moreover, in this embodiment, it is used the USB 3.0 electrical connector receptacle as the second electrical connector 12. As shown in FIG. 2, the second electrical connector 12 is coupled to the first electrical connector 11 through a main cable 13 and having a plurality of pins, wherein the second electrical connector 12 is adopted for connecting a first electronic device 3. The third electrical connector 14 can be an USB 2.0 electrical connector receptacle or an USB 2.0 electrical connector plug, and it is used the USB 2.0 electrical connector receptacle as the third electrical connector 12 in this embodiment. As shown in FIG. 2, the third electrical connector 14 is coupled to the first electrical connector 11 through a branch cable 15 and having a plurality of pins, wherein the third electrical connector 14 is adopted for connecting a second electronic device 4.

Figure 3A:
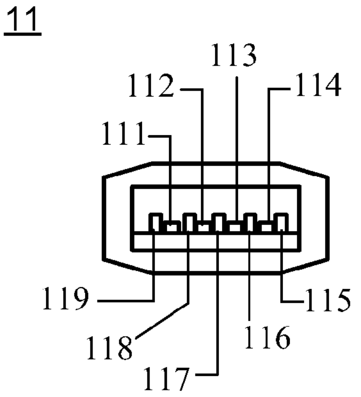
FIG. 3A is a front view of a first electrical connector of the improved USB connection cable according to the present invention.
Figure 3B:
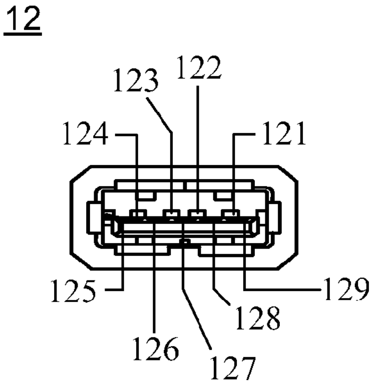
FIG. 3B is the front view of a second electrical connector of the improved USB connection cable according to the present invention.
Figure 3C:
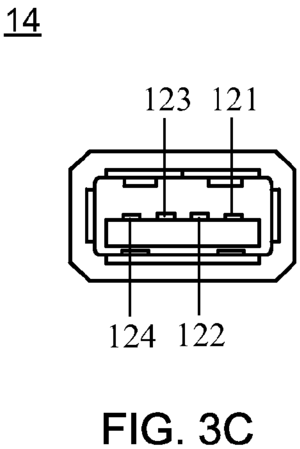
FIG. 3C is the front view of a third electrical connector of the improved USB connection cable according to the present invention.
Figure 4:
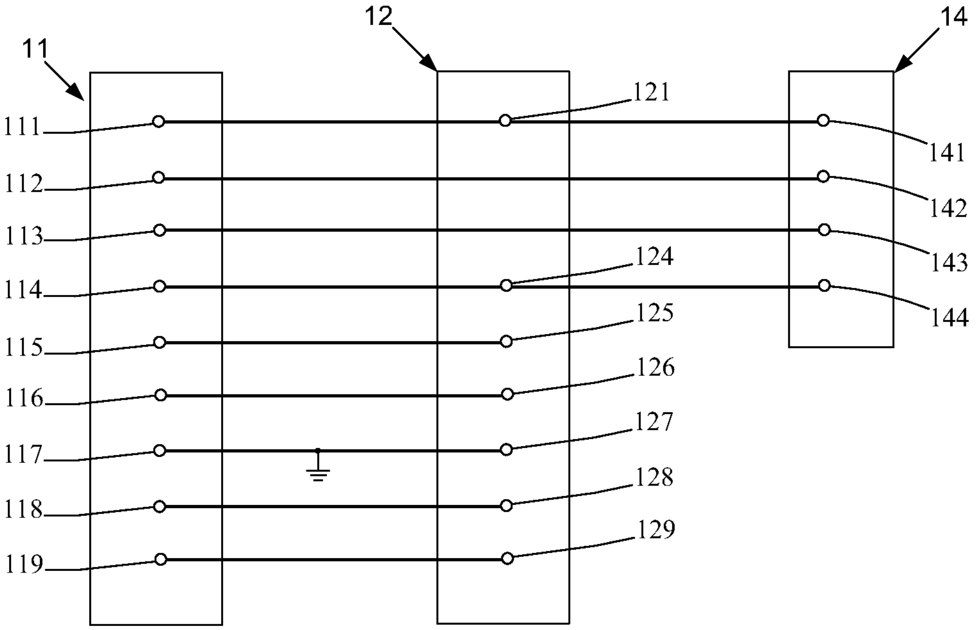
FIG. 4 is the schematic diagram of the internal plural pins connection provided between the first electrical connector, the second electrical connector and the third electrical connector.

Referring to FIG. 2 again, and simultaneously refer to FIG. 3A, FIG. 3B and FIG. 3C, which illustrate is front views of the first electrical connector, the second electrical connector and the third electrical connector of the improved USB connection cable; Moreover, please refer to FIG. 4 at the same time, FIG. 4 illustrates the schematic diagram of the internal plural pins connection provided between the first electrical connector, the second electrical connector and the third electrical connector. As shown in FIG. 3A, FIG. 3B, FIG. 3C, and FIG. 4, the plurality of pins of the first electrical connector 11 includes: a first voltage pin (+5V) 111, a first negative differential signal pin (D−) 112, a first positive differential signal pin (D+) 113, a first ground pin 114, a first negative signal receiving pin (RX−) 115, a first positive signal receiving pin (RX+) 116, a first drain-wire pin 117, a first negative signal transmitting pin (TX−) 118, and a first positive signal transmitting pin (TX+) 119.

The plurality of pins of the second electrical connector 12 includes: a second voltage pin (+5V) 121, a second negative differential signal pin (D−) 122, a second positive differential signal pin (D+) 123, a second ground pin 124, a second negative signal receiving pin (RX−) 125, a second positive signal receiving pin (RX+) 126, a second drain-wire pin 127, a second negative signal transmitting pin (TX−) 128, and a second positive signal transmitting pin (TX+) 129. The plurality of pins of third electrical connector 14 includes: a third voltage pin (+5V) 141, a third negative differential signal pin (D−) 142, a third positive differential signal pin (D+) 143, and a third ground pin 144.

As shown in FIG. 4, the second negative signal receiving pin (RX−) 125 is coupled to the first negative signal receiving pin (RX−) 115, the second positive signal receiving pin (RX+) 126 is coupled to the first positive signal receiving pin (RX+) 116, the second negative signal transmitting pin (TX−) 128 is coupled to the first negative signal transmitting pin (TX−) 118, and the second positive signal transmitting pin (TX+) 129 is coupled to the first positive signal transmitting pin (TX+) 119. So that, when the first electrical connector is connected to the host computer 2 and the second electrical connector 12 is connected to the first electronic device 3, the host computer 2 can transmit data or a control signal to the first electronic device 3 through the first negative signal transmitting pin (TX−) 118 and the first positive signal transmitting pin (TX+) 119 of the first electrical connector 11 and the second negative signal transmitting pin (TX−) 128 and the second positive signal transmitting pin (TX+) 129 of the second electrical connector 12; Moreover, the host computer 2 is able to read and receive the data stored in the first electronic device 3 by way of the first negative signal receiving pin (RX−) 115 and the first positive signal receiving pin (RX+) 116 of the first electrical connector 11 and the second negative signal receiving pin (RX−) 125 and the second positive signal receiving pin (RX+) 126 of the second electrical connector 12.

Besides, the third negative differential signal pin (D−) 142 is coupled to the first negative differential signal pin (D−) 112, and the third positive differential signal pin (D+) 143 is coupled to the first positive differential signal pin (D+) 113. So that, when the first electrical connector 11 is connected to the host computer 2 and the third electrical connector 14 is connected to the second electronic device 3, the host computer 2 can transmit the data or the control signal to the second electronic device 3 via the first negative differential signal pin (D−) 112 and the first positive differential signal pin (D+) 113 of the first electrical connector 11 and the second negative differential signal pin (D−) 142 and the second positive differential signal pin (D+) 143 of the second electrical connector 14.

Furthermore, the second voltage pin 121 is coupled to the first voltage pin 111 and the third voltage pin 141 is coupled to the second voltage pin 121, therefore, when the first electrical connector 11 is connected to the host computer 2, a driving voltage can be transfer to the second voltage pin 121 and the third voltage pin 141 via the first electrical connector 11. In addition, the second ground pin 124 is coupled to the first ground pin 114 and the third ground pin 144 is coupled to the second ground pin 124, such that the first ground pin 114, the second ground pin 124 and the third ground pin 144 would be ground when the first electrical connector 11 is connected to the host computer 2. Besides, the second drain-wire pin 127 is coupled to the first drain-wire pin 117 for prevent from signal disturbance when the first electrical connector 11 and the second electrical connector 12 are transmitting data or the control signal.

Thus, through the above descriptions, the exemplary framework of the improved USB connection cable of the present invention has been clearly disclosed and introduced; So that, in summary, the present invention has the following advantages:

1. In the present invention, the internal pins of the first USB electrical connector 11 are connected to the internal pins of the second USB electrical connector 12 and the third USB electrical connector 14, so as to make the first electrical connector 11 capable of transmitting data to the second USB electrical connector 12 and the third electrical connector 14.
2. Inheriting to above point 1, such that the improved USB connection cable 1 able to not only be a media for data transfer used between an electronic device having at least one USB 3.0 electrical connector and a host computer with at least one USB 3.0 electrical connector, but also be the media for data transfer used between an electronic device having at least one USB 2.0 electrical connector and the host computer with the at least one USB 3.0 electrical connector.
3. Inheriting to above point 1 and point 2, therefore, when the user connects the improved USB connection cable to the electronic device having the USB 3.0 electrical connector, the USB 2.0 electrical connector and the host computer with the USB 3.0 electrical connector, the user is able to simultaneously transmit data to/receive data from the electronic device having the USB 3.0 electrical connector and the USB 2.0 electrical connector through the host computer.

The above description is made on embodiments of the present invention. However, the embodiments are not intended to limit scope of the present invention, and all equivalent implementations or alterations within the spirit of the present invention still fall within the scope of the present invention.

I claim:

1. An improved USB connection cable, comprising:

a first USB 3.0 electrical connector (11), being used for connecting a host computer and having a plurality of pins, and the plurality of pins comprising a first voltage pin (+5V) (111), a first negative differential signal pin (D−) (112), a first positive differential signal pin (D+) (113), a first ground pin (114), a first negative signal receiving pin (RX−) (115), a first positive signal receiving pin (RX+) (116), a first drain-wire pin (117), a first negative signal transmitting pin (TX−) (118), and a first positive signal transmitting pin (TX+) (119);

a second USB 3.0 electrical connector (12), being coupled to the first USB 3.0 electrical connector (11) through a main cable (13) and adopted for connecting a first electronic device; wherein the second USB 3.0 electrical connector (12) comprising:

a second voltage pin (+5V) (121), being coupling to the first voltage pin (+5V) (111) through the main cable (13);

a second negative differential signal pin (D−) (122);

a second positive differential signal pin (D+) (123);

a second ground pin (124), being coupling to the first ground pin (114) through the main cable (13);

a second negative signal receiving pin (RX−) (125), being coupling to the first negative signal receiving pin (RX−) (115) through the main cable (13);

a second positive signal receiving pin (RX+) (126), being coupling to the first positive signal receiving pin (RX+) (116) through the main cable (13);

a second drain-wire pin (127), being coupling to the first drain-wire pin (117) through the main cable (13);

a second negative signal transmitting pin (TX−) (128), being coupling to the first negative signal transmitting pin (TX−) (118) through the main cable (13); and a second positive signal transmitting pin (TX+) (129), being coupled to the first positive signal transmitting pin (TX+) (119) through the main cable (13); and a USB 2.0 electrical connector (14), being coupled to the first USB 3.0 electrical connector (11) through a branch cable (15) and adopted for connecting a second electronic device; wherein the USB 2.0 electrical connector (14) comprising:

a third voltage pin (+5V) 141, being coupling to the second voltage pin (+5V) (121) through the branch cable (15), such that the third voltage pin (+5V) 141 is further coupled to the first voltage pin (+5V) (111) via the second voltage pin (+5V) (121);

a third negative differential signal pin (D−) 142, being coupling to the first negative differential signal pin (D−) (112) through the branch cable (15), the second USB 3.0 electrical connector (12) and the main cable (13);

a third positive differential signal pin (D+) 143, being coupling to the first positive differential signal pin (D+) (113) through the branch cable (15), the second USB 3.0 electrical connector (12) and the main cable (13); and a third ground pin 144, being coupling to the second ground pin (124) through the branch cable (15), such that the third ground pin 144 is further coupled to the first ground pin (114) via the second ground pin (124);

wherein when the first USB 3.0 electrical connector (11) is connected to the host computer and the second USB 3.0 electrical connector (12) is connected to the first electronic device, the data transmission can be carried out between the host computer and the first electronic device through the first negative signal receiving pin (RX−) (115), the first positive signal receiving pin (RX+) (116), the first negative signal transmitting pin (TX−) (118), and the first positive signal transmitting pin (TX+) (119) of the first USB 3.0 electrical connector (11), as well as the second negative signal receiving pin (RX−) (125), second positive signal receiving pin (RX+) (126), second negative signal transmitting pin (TX−) (128), and second positive signal transmitting pin (TX+) (129) of the second USB 3.0 electrical connector (12);

wherein when the first USB 3.0 electrical connector (11) is connected to the host computer and the USB 2.0 electrical connector (14) is connected to the second electronic device, the data transmission can be carried out between the host computer and the second electronic device through the first negative differential signal pin (D−) (112) and the first positive differential signal pin (D+) (113) of the first USB 3.0 electrical connector (11), as well as the third negative differential signal pin (D−) (142) and third positive differential signal pin (D+) 143 of the USB 2.0 electrical connector (14);

wherein the second negative differential signal pin (D−) (122) and the second positive differential signal pin (D+) (123) are floated in the connection of the first USB 3.0 electrical connector (11) and second USB 3.0 electrical connector (12) as well as the connection of the first USB 3.0 electrical connector (11) and the first USB 3.0 electrical connector (11).

2. The improved USB connection cable of claim 1, wherein the first USB 3.0 electrical connector (11) is selected from the group consisting of: an USB 3.0 electrical connector plug and an USB 3.0 electrical connector receptacle.

3. The improved USB connection cable of claim 1, wherein the second USB 3.0 electrical connector (12) is selected from the group consisting of: an USB 3.0 electrical connector receptacle and an USB 3.0 electrical connector plug.

4. The improved USB connection cable of claim 1, wherein the USB 2.0 electrical connector (14) is selected from the group consisting of: an USB 2.0 electrical connector receptacle and an USB 2.0 electrical connector plug.

* * * * *